United States Patent
Wahlmüller et al.

(10) Patent No.: US 8,557,455 B2
(45) Date of Patent: Oct. 15, 2013

(54) METHOD FOR CONTROLLING THE PRESSURE IN AN ANODE OF A FUEL CELL, AND A FUEL CELL

(75) Inventors: Ewald Wahlmüller, Linz (AT); Christian Riffelsberger, Thalheim/Wels (AT); Werner Rumpl, Weisskirchen (AT)

(73) Assignee: Fronius International GmbH, Pettenbach (AT)

( * ) Notice: Subject to any disclaimer, the term of this patent is extended or adjusted under 35 U.S.C. 154(b) by 646 days.

(21) Appl. No.: 12/226,360

(22) PCT Filed: Feb. 14, 2007

(86) PCT No.: PCT/AT2007/000080
§ 371 (c)(1),
(2), (4) Date: Oct. 16, 2008

(87) PCT Pub. No.: WO2007/128007
PCT Pub. Date: Nov. 15, 2007

(65) Prior Publication Data
US 2009/0104478 A1    Apr. 23, 2009

(30) Foreign Application Priority Data
May 5, 2006    (AT) .................................. A 782/2006

(51) Int. Cl.
*H01M 8/04*    (2006.01)
(52) U.S. Cl.
USPC ........................................................ 429/415
(58) Field of Classification Search
None
See application file for complete search history.

(56) References Cited

U.S. PATENT DOCUMENTS

| | | |
|---|---|---|
| 4,791,033 A | 12/1988 | Patel |
| 5,068,159 A | 11/1991 | Kinoshita |
| 5,079,103 A | 1/1992 | Schramm |
| 5,208,113 A | 5/1993 | Kinoshita |
| 5,366,818 A | 11/1994 | Wilkinson et al. |
| 2002/0150802 A1* | 10/2002 | Imamura et al. ................ 429/24 |

(Continued)

FOREIGN PATENT DOCUMENTS

WO    WO 2005/024984    3/2005

OTHER PUBLICATIONS

International Search Report issued May 7, 2007, for PCT/AT2007/000080.*
International Search Report, Published May 7, 2007.

*Primary Examiner* — Patrick Ryan
*Assistant Examiner* — Wyatt McConnell
(74) *Attorney, Agent, or Firm* — Collard & Roe, P.C.

(57) ABSTRACT

A method for controlling the anode pressure of a fuel cell is disclosed, with hydrogen fed to the anode via a feed-pressure control unit, and a gas/condensate mixture periodically discharged from the anode via a discharge-pressure control unit into a reservoir, with the gas portion fed back to the anode. To effect feedback of hydrogen the pressure in the reservoir is adapted to that in the hydrogen feed means during discharge, whereupon the discharge-pressure control unit is closed and the feed-pressure control unit and a feedback-pressure control unit are controlled such that the pressure in the reservoir changes due to consumption at the anode until a desired pressure in the reservoir is reached and/or a preset pressure in the anode is reached, whereupon the feedback-pressure control unit and the feed-pressure control unit are controlled such that the pressure in the anode adapts to a preset desired value.

23 Claims, 3 Drawing Sheets

(56) References Cited

U.S. PATENT DOCUMENTS

| | | |
|---|---|---|
| 2004/0229087 A1 | 11/2004 | Senner et al. |
| 2005/0142400 A1 | 6/2005 | Turco et al. |
| 2005/0175872 A1* | 8/2005 | Trabold et al. .................. 429/25 |
| 2006/0073363 A1 | 4/2006 | Taniguchi et al. |

* cited by examiner

METHOD FOR CONTROLLING THE PRESSURE IN AN ANODE OF A FUEL CELL, AND A FUEL CELL

CROSS REFERENCE TO RELATED APPLICATIONS

This application is the National Stage of PCT/AT2007/000080 filed on Feb. 14, 2007, which claims priority under 35 U.S.C. §119 of Austrian Application No. A 782/2006 filed on May 5, 2006. The international application under PCT article 21(2) was not published in English.

The invention relates to a method for controlling a pressure in an anode of a fuel cell, with hydrogen being fed to the anode via a feed-pressure control unit, and oxygen or air being fed to the cathode, and a mixture, which consists of a gas portion and a condensate being periodically discharged from the anode via a discharge line via a discharge-pressure control unit and collected and separated in a reservoir, and with the gas portion being fed back to the anode.

Furthermore, the invention relates to a fuel cell, comprising at least one cell with one anode and one cathode each, wherein the anode is connected with a hydrogen-feed means comprising a feed-pressure means, and the cathode is connected with an oxygen-feed or air-feed means, and the anode is furthermore connected with a discharge line, which comprises a discharge-pressure control unit, for discharging a mixture consisting of a gas portion and a condensate, wherein the discharge line is connected with a reservoir connected with the anode via a feedback line for feeding back hydrogen separated from the reservoir.

The invention relates to a fuel-cell system, whose degree of efficiency shall be as high as possible. To this end, it is necessary to keep constant the cell voltage of the individual fuel cells at its maximum value, as possible, with the hydrogen reacting with oxygen in said fuel cells. Here, it is required to partly periodically discharge the hydrogen fed into the anode of the fuel cell, what is called "purging". To achieve that the discharged hydrogen, which is actually a mixture (purge) of hydrogen, reaction water and inert gases, is exploited before it will be discharged, leading to a lower degree of efficiency, said hydrogen is collected in a reservoir. In this reservoir, in particular the hydrogen is separated from the mixture and/or the reaction water so that the gaseous portion of the purge, i.e. the hydrogen, can be again fed back into the fuel cell.

Several methods have been known from the prior art for realizing said feedback.

From US 2005/0142400 A1 a method is known by means of which hydrogen discharged from the fuel cell is again fed back into the latter. This is achieved in that a mixture of water and inert gases is discharged from the anode into a tank. The inert gases also comprise hydrogen to be again fed back into the anode. To this end, the hydrogen feed is stopped and, due to the pressure prevailing in the tank, the hydrogen will be fed back into the anode. This is effected in the same manner as the mixture was discharged. As soon as the whole hydrogen has been fed back from the tank and the hydrogen present in the anode has been completely consumed, hydrogen will again be fed to the anode, i.e. the hydrogen-feed means will again be opened. Here, the feed is controlled by a mechanical pressure controller.

In this context, it is disadvantageous that not all of the fuel-cell cells can be evenly supplied with hydrogen with this type of feedback, whereby the cells cannot provide the maximum possible cell voltage. Thus, the degree of efficiency of the fuel-cell system will be reduced.

Likewise, it is disadvantageous that the anode will again be supplied with hydrogen only after the whole hydrogen has been fed back from the tank and the hydrogen present in the anode has been completely consumed. Here, an idle may be the result during which the anode will not be supplied with hydrogen, shortening the service life of the fuel cell.

U.S. Pat. No. 5,366,818 A describes a method, wherein hydrogen discharged from the fuel cell is fed back into the feed means of hydrogen. This is effected in that a mixture (hydrogen, water and inert gas) discharged from the fuel cell is collected in a separation reservoir. In the separation reservoir, in particular the hydrogen and the water are separated, and the hydrogen is admixed to the pure hydrogen in the feed means via a compressor and a deionizing filter.

Here, it is disadvantageous that the hydrogen is recirculated via a compressor and a deionizing filter. In particular, the compressor lowers the degree of efficiency of the fuel-cell system since the compressor is a power-consumer. The deionizing filter in the recirculation line has negative effects inasmuch as it is a high flow resistor. In order to compensate this, the output of the compressor would have to be increased, causing the degree of efficiency to become even lower.

Likewise, it is disadvantageous that the compressor and the deionizing filter require high maintenance efforts, increasing operation costs of the fuel-cell system.

Thus, the object of the invention is to create an above-mentioned method and an above-mentioned fuel cell by means of which the hydrogen is fed back into the fuel cell at minimum power consumption, and by means of which the maximum possible degree of efficiency of the fuel-cell system is reached.

The object of the invention is achieved by an above-mentioned pressure-control method, wherein the discharge-pressure control unit is opened for periodically discharging the mixture, and that the mixture is conveyed into the reservoir via the discharge line, with the pressure prevailing in the reservoir being lower than that in the feed means of hydrogen, wherein substantially the pressure prevailing in the reservoir is adapted to the pressure in the feed means of hydrogen, whereupon the discharge-pressure control unit will be closed and the feed-pressure control unit and a feedback-pressure control unit, which is provided in a feedback line for feeding back the gas portion from the reservoir to the anode, will be controlled such that the pressure prevailing in the reservoir will be changed due to the own pressure consumption of the anode until a desired value will be reached in the reservoir and/or a preset threshold value for the pressure in the anode will be reached, whereupon the feedback-pressure control unit and the feed-pressure control unit will be controlled such that the pressure in the anode will be adapted to a preset desired value. Here, it is advantageous that the degree of efficiency of the fuel-cell system can thereby be increased by up to five percent. This is achieved by feeding back the combustible gas portion from the mixture in the reservoir with a very low additional power consumption, i.e. using the inventive pressure control. Thus, the increased degree of efficiency is advantageously achieved by the corresponding pressure differences between the anode and the reservoir. Due to the feedback the hydrogen of the gas portion from the reservoir is consumed in the anode and converted into current, thus generally reducing hydrogen consumption. This has positive effects on the degree of efficiency of the fuel-cell system, by increasing the same. Furthermore, thanks to the reservoir a large amount of mixture can be discharged from the anode without losing precious hydrogen and without lowering the degree of efficiency. Likewise, a larger amount of water is discharged from the anode together with the larger amount of mixture, whereby the cell voltage is maintained almost at is maximum value and, thus, the degree of efficiency remains high. Due to the pressure control no additional consumers, e.g. a hydrogen pump for feedback, are required, which would lower the degree of efficiency of the fuel-cell system.

By the measures of claims 2 and 3 it is advantageously achieved that the maximum cell voltage is ensured during almost the entire operation of the fuel cell, thus correspondingly increasing the degree of efficiency.

Advantageously, according to claims 4 and 5 it is achieved that the degree of efficiency of the fuel-cell system is not lowered by discharging the mixture.

According to claims 6 to 8 it is also advantageous that the gas portion from the reservoir may only be fed back and/or recirculated by means of pressure equalization. Thus, the maintenance-intensive hydrogen circulation pump is advantageously replaced.

By the measures of claims 9 and 10 it is advantageously achieved that the pressure prevailing in the reservoir is reduced, thus ensuring the pressure difference necessary between the reservoir and the feed means of the hydrogen for the following discharge cycle.

According to claim 11 it is advantageously achieved that the pressure in the anode falls due to the lacking or reduced hydrogen supply via the feed-pressure control unit, with the pressure difference between the reservoir and the anode allowing for feedback. Likewise, it is also advantageous that the hydrogen supply of the anode is not interrupted and/or the hydrogen necessary is fed continuously.

According to claim 12 it is also advantageous that the pressure in the anode falls by the minimal hydrogen supply, with the pressure difference between the reservoir and the anode allowing for feedback. Likewise, it is also advantageous that the anode, additionally to being supplied from the reservoir, may optionally be supplied with hydrogen. Thus, the anode will in any case be supplied with the necessary amount of hydrogen, and the degree of efficiency of the fuel-cell system will be kept constant in any state of operation.

By the measures of claims 13 and 14 it is advantageously achieved that the pressure difference between the reservoir and the feed means of the hydrogen necessary for feeding back the gas portion from the reservoir is provided. Likewise, an interruption-free hydrogen supply of the anode is thus advantageously ensured, whereby the degree of efficiency of the fuel-cell system is kept high.

According to claim 17 it is advantageously achieved that thanks to the constant pressure the tension of the individual fuel-cell cells is kept constant at its maximum value, thus improving the degree of efficiency.

According to claim 18 it is also advantageous that the degree of efficiency of the fuel-cell system is kept constant at any state of operation, irrespective of the changes in pressure.

By the measures according to claim 19 it is advantageously achieved that the flow direction of the hydrogen through the anode is maintained, thus improving discharge of the condensate.

According to claim 20 it is advantageously achieved that the discharge of the mixture, and the feedback of the hydrogen, from the reservoir into the anode is done via a line and a pressure-control unit.

According to claim 21 it is also advantageous that the hydrogen portion in the condensate is reduced such that only an uncritical percentage of hydrogen emissions is emitted to the environment. This is advantageously effected without using any additional components, e.g. a catalytic burner, thus avoiding formerly necessary protective measures requiring high efforts.

By the measures according to claim 22 it is advantageously achieved that the cathode of the fuel cell will be humidified, thus improving the degree of efficiency. Likewise, it is advantageous that the hydrogen portion of the condensate reacts on a catalyst layer in the cathode, whereby said portion is oxidized with oxygen. Thus, no additional measures for treating the hydrogen emitted are necessary, e.g. treating by catalytic oxidation in a catalytic burner, or dilution with air prior to discharge to the environment.

According to claim 23 it is advantageously achieved that the condensate is allowed to be admixed to the cathode supply air to the cathode air humidification.

According to claim 24 it is also advantageous that this is achieved by the small hydrogen portion in the condensate, whereby there is no need for subsequent effort-requiring measures for treating the hydrogen emitted, e.g. by catalytic oxidation, or dilution with air.

The inventive object is also achieved by an above-mentioned fuel cell, wherein a feedback-pressure control unit is arranged in the feedback line and connected with a control means, as are the feed-pressure control unit and the discharge-control unit, so that the above-mentioned pressure-control method can be conducted.

By the measures of claims 26 and 27 it is advantageously achieved that the cathode of the fuel cell is humidified and the degree of efficiency is improved.

The measure of claim 28 allows for admixture of the condensate to the cathode supply air to the cathode air humidification.

According to claims 29 and 30 it is advantageously achieved that the switch valves and/or the control valve require only minimum activation current, whereby the negative effects on the degree of efficiency of the fuel-cell system are negligible.

By the measures of claim 31 it is advantageously achieved that no activation is necessary for the non-return valve and, thus, no current is consumed, having positive effects on the degree of efficiency.

Finally, the measures according to claim 32 allow for a control as a function of the cell voltage of the fuel cell.

The present invention will be explained in more detail by means of the enclosed schematic drawings.

Therein.

Initially, it is pointed out that same parts of the exemplary embodiment are designated by the same reference numbers.

Figure 1:
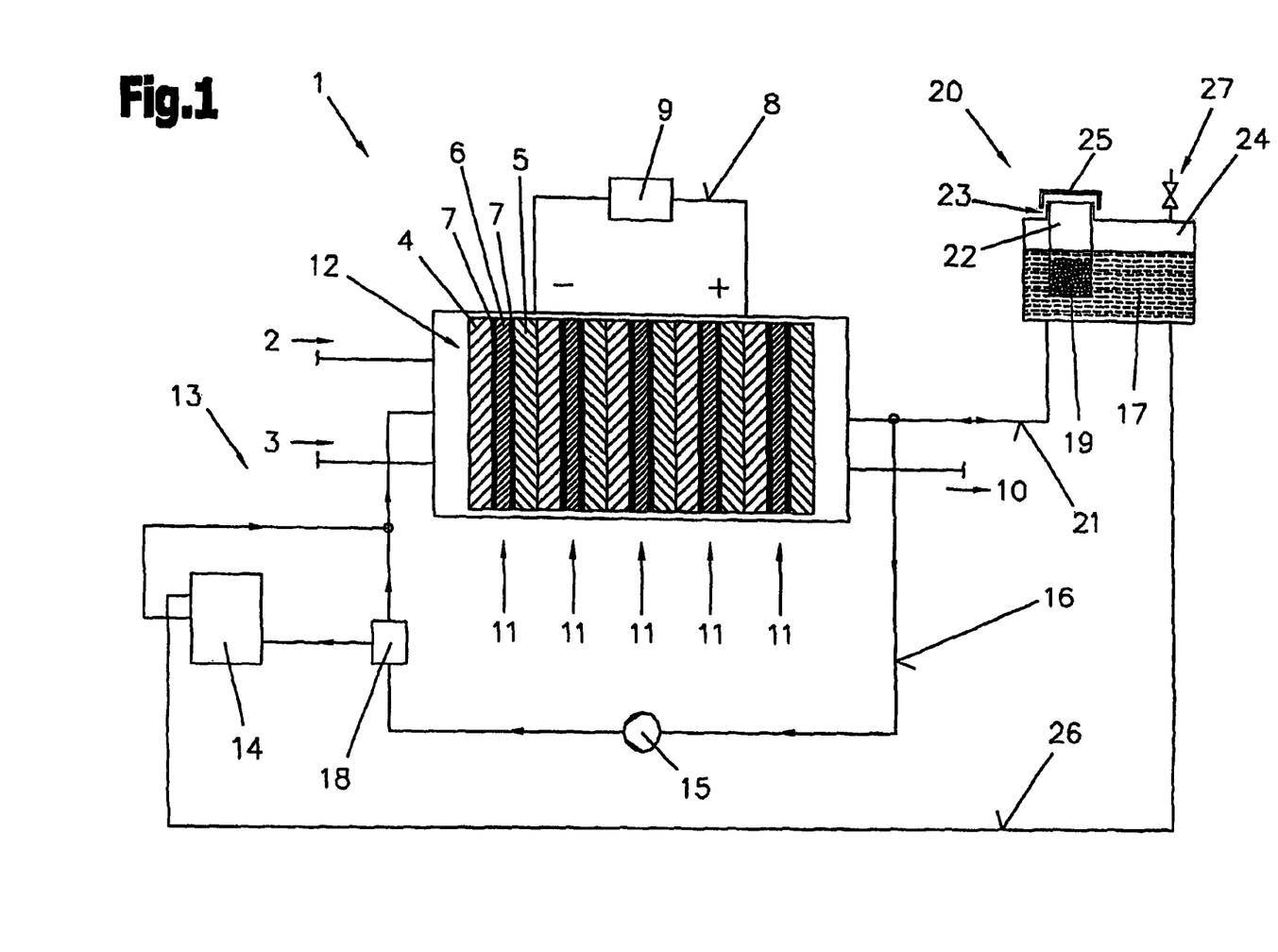
FIG. 1 shows the schematic structure of a fuel cell.

FIG. 1 shows a fuel cell 1 for generating current from hydrogen 2 and oxygen 3 and/or air.

Fuel cells 1 are electro-chemical current generators which generate electric current directly from a chemical reaction. This is effected by reversing the electrolytic dissociation of water, during which the gases hydrogen 2 and oxygen 3 are formed by a current flow.

In the fuel cell 1, hydrogen 2 reacts with oxygen 3, thus generating current. To this end, hydrogen 2 is fed at an anode 4 and oxygen 3 at a cathode 5, with the anode 4 and the cathode 5 being separated by an electrolyte 6. Furthermore, on the side facing the electrolyte 6, the anode 4 and the cathode 5 are coated with a catalyst 7, usually made of platinum. Thereby, hydrogen 2 can react with oxygen 3, this being effected in two separated individual reactions at both electrodes, the anode 4 and the cathode 5.

Hydrogen 2 is fed to the anode 4, reacts at the catalyst 7 and cleaves each hydrogen molecule into two hydrogen atoms. A hydrogen atom consists of two components, one negatively charged electron and one positively charged proton. Each hydrogen atom releases its electron. The positively charged protons diffuse through the electrolyte 6 to the cathode 5, said electrolyte being impermeable for negatively charged electrons.

At the same time as hydrogen 2 is fed at the cathode 5, oxygen 3 is fed at the anode 4. The oxygen molecules react at the catalyst 7 and divide themselves into two oxygen atoms each, which deposit at the cathode 5.

Thus, the positively charged protons of the hydrogen 2 and the oxygen atoms are deposited at the cathode 5 and the negatively charged electrons of the hydrogen 2 at the anode 4. Thereby, there is a so-called lack of electrons at the cathode 4 and a so-called electron excess at the anode 4. This leads to a negative charge at the anode 4 and to a positive charge at the cathode 5. This means that the anode 4 corresponds to a negative pole (−) and the cathode 5 to a positive pole (+).

If the anode 4 and the cathode 5 are connected with an electrical conductor 8, due to the potential differences the electrons will migrate from the anode 4 to the cathode 5 via the electrical conductor 8. This means that electric direct current flows via a consumer 9 connected to the conductor 8. The consumer 9 may, for example, also be formed by a battery, which stores the current generated, or by a DC-to-AC converter, which converts the generated direct current into alternating current.

Two electrons, which have migrated from the anode 4 to the cathode 5 via the electrical conductor 8, are received by one oxygen atom each in the cathode 5 and become doubly negatively charged oxygen ions. These oxygen ions unite with the positively charged protons of the hydrogen 2 to water 10, said protons having diffused from the anode 4 through the electrolyte 6 onto the cathode 5. The water 10 is discharged as so-called reaction end product at the cathode 5.

This means that hydrogen 2 reacts with oxygen 3 in a cell 11 of the fuel cell 1, whereby current is generated. A cell 11 is formed by the anode 4, cathode 5, electrolyte 6 and catalyst 7. A connection of several cells 11 in series is generally referred to as stack 12.

The reaction of hydrogen 2 with oxygen 3 in the individual cells 11 of a stack 12 produces heat which has to be dissipated. This is effected via a cooling system 13, which, in its most simple form, consists of a cooling unit 14, a pump 15 and a cooling circuit 16. Here, the pump 15 pumps a cooling means 17 present in the cooling circuit 16 through the stack 12 of the fuel cell 1, e.g. in the direction indicated by the arrows. Thus, the cooling means 17 withdraws the heat from the stack 12 by absorbing the heat. The cooling unit 14 in the cooling circuit 16 withdraws the heat from the cooling means 17 and conveys it to the ambient air so that the cooling means 17 is again capable of withdrawing the heat from the stack 12. The cooling circuit 16 may also be controlled such that the cooling means 17 flows through the cooling unit 14 only when the cooling means 17 has a certain temperature. This control is correspondingly effected via a thermostat 18.

Since the cooling system 13 is a component of the fuel cell 1, it is subjected to the voltage produced by the cells 11. This is why it is important that the cooling means 17 does not cause any noteworthy current flow between the cells 11. Thus, for example, deionized water (DIW) or a mixture of ethylene glycol and water with low electrical conductivity is used as a cooling means 17.

The electrical conductivity of the cooling means 17 is reduced by using a deionizing resin 19, which consists, e.g., of a base anion resin or mixed bed resin. The deionizing resin 19 has the effect that electrically conductive ions (anions and cations) released by different processes (corrosion, oxidation, . . . ) are absorbed into the cooling means 17. Thus, the conductivity of the cooling means 17 can be kept preferably below 5 μS/cm, avoiding parasitic flows which would lower the degree of efficiency and would cause side reactions which would lead to corrosion in the cooling system 13. The deionizing resin 19 may be integrated into an equalizing reservoir 20, and the latter be connected with the cooling circuit 16 via a line 21. Thus, the deionizing resin 19 is not directly integrated into the cooling circuit 16, whereby said resin does not cause any high flow resistance for the cooling means 17. Nevertheless, the conductivity of the cooling means 17 is kept continuously low. This is effected via diffusion processes and due to concentration differences between the cooling means 17 in the equalizing reservoir 20 and the cooling means 17 in the cooling circuit 16. Likewise, this can be assisted by a degassing line 26.

Preferably, the deionizing resin 19 is provided in a reservoir 22 or a sack or a small sack made of perforated material, which is introduced into an interior room 24 of the equalizing reservoir 20 via a fill-in opening 23 of the equalizing reservoir 20. Preferably, the fill-in opening 23 may be closed by a screw cap 25. Thus, the deionizing resin 19 may optionally be exchanged or refilled in a simple manner during operation of the fuel cell 1 without interrupting the cooling. Furthermore, the equalizing reservoir 20 has an overpressure security unit 27 or a ventilation means 28, i.e. a pressure-relief valve and/or a discharge valve. On the one hand, such a cooling system 13 considerably prolongs the service life of the cooling means 17, and, on the other hand, allows for the temperature of the cells 17 to be kept at a constant level, ensuring an optimum operation of the fuel cell 1.

In practice, during operation of a fuel cell 1 the hydrogen fed to the anode 4 cannot be consumed completely since the oxygen 3 diffuses from the cathode 5 through the electrolyte 6 or the electrolyte membrane to the anode 4 and, there, reacts with the hydrogen 2 to water 10. This is mainly caused by concentration and pressure gradients between the anode 4 and the cathode 5, and by a very small layer thickness (<100 μm) of the electrolyte membrane used. Accordingly, the hydrogen 2 also diffuses through the membrane to the cathode 5, and water 10 is produced.

Basically, the water 10 produced at the anode 4 and the cathode 5 serves for their humidification. Since, however, the water 10 is continuously produced by the reaction of hydrogen 2 with oxygen 3, it accumulates at the electrodes and reduces cell voltage. In particular, this has extremely negative effects on the anode 4 since also some of the hydrogen 2 present at the anode 4 is always removed when the water 10 is removed. Thereby, the degree of efficiency of the fuel-cell system is correspondingly lowered. On the contrary, at the cathode 5 the excessive water 10 may without concern be removed together with the reaction air.

Figure 2:
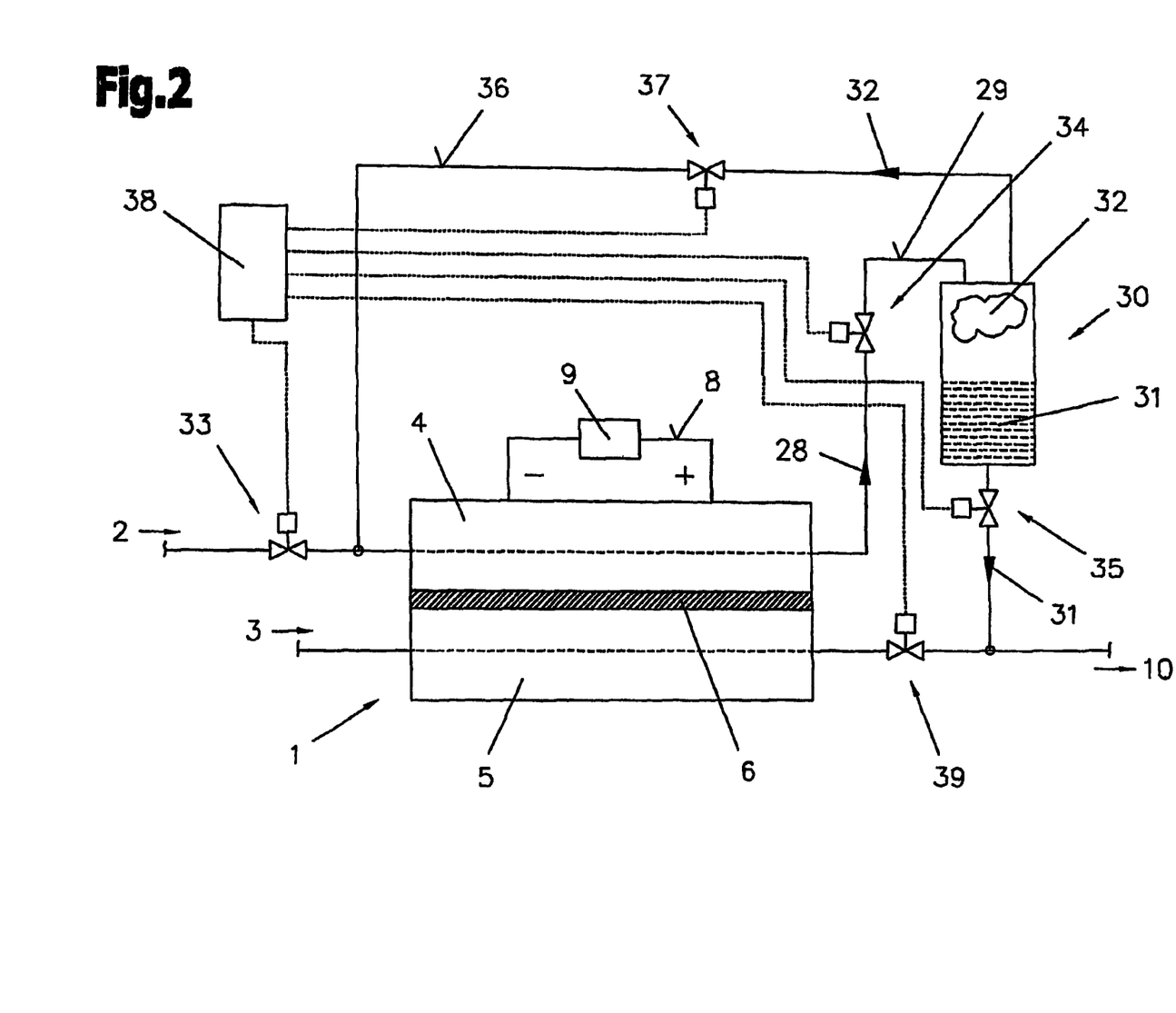
FIG. 2 shows the simplified structure of a fuel cell for the pressure-control method in schematic representation.

Water is discharged from the anode 4 by conveying the mixture 28 consisting of water 10, inert gases and some hydrogen 2 via a corresponding discharge line 29 into a reservoir 20, as is illustrated in FIG. 2. In the reservoir 30, the water 10 and part of the inert gases accumulate at the bottom as so-called condensate 31 and the remaining part of the inert gases and the hydrogen 2 accumulate in the upper region as gas portion 32. In particular, the hydrogen 2 may be fed back from the reservoir 30 to the anode 4 of the fuel cell 1. This may be done, e.g., in a manner known from U.S. Pat. No. 5,366,818 A. Here, the degree of efficiency is not substantially improved since a special pump is required for feedback, lowering the degree of efficiency.

According to the invention, it is now provided to effect the discharge and feedback of hydrogen 2 via a pressure-control method so as to substantially improve the degree of efficiency of the fuel-cell system. This is facilitated by using only components consuming very little current.

In the following, the inventive pressure-control method will be described by means of FIGS. 2 to 6.

FIG. 2 illustrates the structure necessary for the inventive pressure-control method. Hydrogen 2 is fed to the fuel cell 1 and/or the anode 4 of the stack 12 via a feed-pressure control unit 33. A discharge line 29 is provided at the anode 4 to allow for the water 10 and the inert gases to be discharged from the anode 4. The discharge line 20 connects the anode 4 with the reservoir 30. The discharge of the mixture 28 via the discharge line 29 is appropriately controlled via a discharge-pressure control unit 34. Preferably, the mixture 28 is filled into the upper region of the reservoir 30 via the discharge line 29. Thus, the condensate 31 may easily accumulate at the bottom and the gas portion 32 of less weight of the mixture 28 in the upper region of the reservoir 30.

After a certain amount of the condensate 31 has been reached, it must be discharged from the reservoir 30 so as to provide sufficient room for the mixture 28 following. The condensate 31 is discharged by drainage via a condensate-pressure control unit 35 at the bottom of the reservoir 30.

In contrast to the condensate 31, the gas portion 32 is removed from the upper region of the reservoir 30 and is preferably fed back to the feed means of hydrogen 2, preferably between the feed-pressure control unit 33 and the anode 4. This is done via a corresponding feedback line 36 and a feedback-pressure control unit 37.

For performing the inventive pressure-control method, corresponding pressure-control units 33, 34, 35, 37 are connected with a control means 38 so that they can be appropriately activated and/or controlled.

Of course, the control means 38 may also activate and/or control further pressure-control units necessary for operating the fuel cell 1, e.g. an exhaust-air pressure control unit 39. Preferably, the control means 38 is also connected with corresponding sensors (not illustrated), based on which the pressure-control method is conducted.

Figure 3:
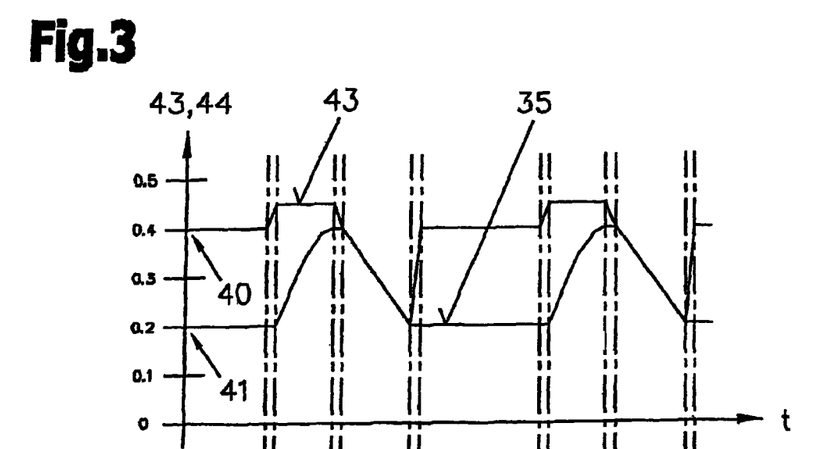
FIG. 3 shows the pressure courses in the anode and in the reservoir.
Figure 4:
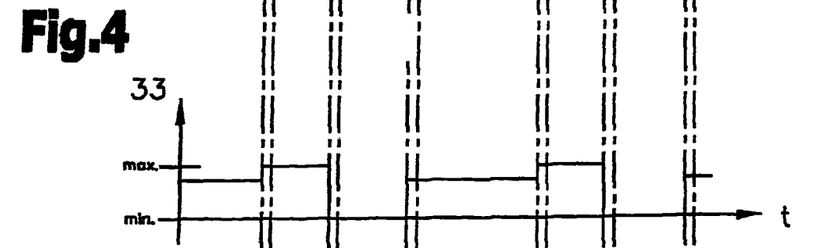
FIG. 4 shows the state of the feed-pressure control unit.
Figure 5:
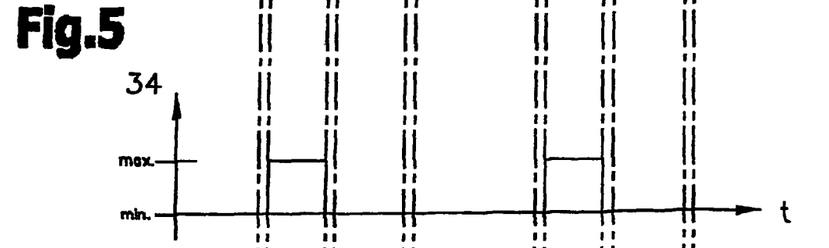
FIG. 5 shows the state of the discharge-pressure control unit.
Figure 6:
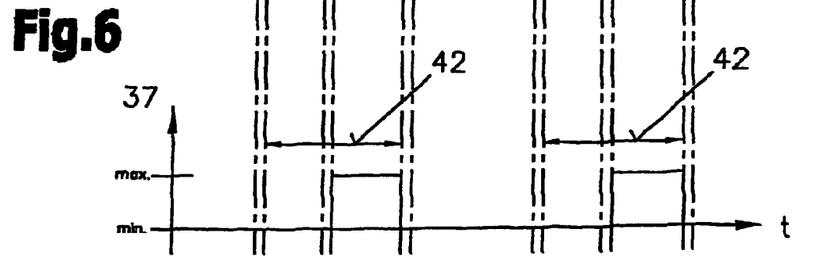
FIG. 6 shows the state of the feedback-pressure control unit.

FIG. 3 shows the pressure courses in the feed means of hydrogen 2, which pressure substantially corresponds to the pressure in the anode 4, and in the reservoir 30 according to the inventive pressure-control method, as a function of time t. Related to the pressure courses of FIG. 3, the states of the corresponding pressure-control units are illustrated via time t in FIGS. 4 to 6. Here, the state of the respective opening corresponds to the respective pressure-control unit. This is correspondingly illustrated by minimum (min.) and maximum (max.). FIG. 4 shows the respective state and desired pressure value of the feed-pressure control unit 33, FIG. 5 illustrates those of the discharge-pressure control unit 34, and FIG. 6 represents those of the feedback-pressure control unit 37.

During normal operation of the fuel cell 1 the pressure at the anode 4 corresponds to its desired value 40, preferably lies in the range of about 0.4 bar. Accordingly, the pressure prevailing in the reservoir 30 is lower than the pressure at the anode 4, wherein the pressure during normal operation is set to a desired value 41 which lies in the region of about 0.2 bar.

Thus, the pressure difference necessary between the anode 4 and the reservoir 30 is provided for the inventive pressure-control method so as to allow for a discharge-cycle 42 to be conducted. During the discharge cycle 42 the pressure 43 at the anode 4 and the pressure 44 prevailing in the reservoir 30 change according to FIG. 3

Before the discharge cycle 42 will be started as soon as the discharge-pressure control unit 34 is opened, the pressure at the anode 4 is increased, e.g., to 0.45 bar (i.e. substantially as soon as the discharge cycle 42 is started). After this pressure has been reached, the discharge-pressure control unit 34 will be opened. This results in that the mixture 28 is conveyed from the anode 4 into the reservoir 30 via the discharge line 29 since the pressure prevailing in the reservoir 30 is only 0.2 bar, whereas the pressure in the anode 4 is 0.45 bar. The pressure prevailing in the reservoir 30 rises correspondingly as the amount of the mixture 28 in the reservoir 30 increases. The pressure rise in the reservoir 30 is reduced during discharge of the mixture 28. The smaller the rise the smaller the discharge effect. This is why the discharge-pressure control unit 34 will be closed if the discharge effect becomes too small due to the ever-reducing pressure difference between the reservoir 30 and the anode 4. For example, this is effected at about 0.4 bar. As a rule, this is an empirical value. On the contrary, the pressure at the anode 4 is kept substantially constant at 0.45 bar during discharge.

As soon as the discharge-pressure control unit 34 is closed, the feed-pressure control unit 33 will also substantially be closed and the feedback-control unit 37 be opened, wherein the feedback-control unit 37 will preferably be opened a certain period after the pressure control unit 33, 34 have been closed. This results in that the pressure in the anode 4 falls since no hydrogen 2 is fed any longer but hydrogen 2 is still consumed for generating current. Thus, the pressure prevailing in the reservoir 30 is higher than in the anode 4, with the pressure difference causing the gas portion 32 to be fed to the anode 4 via the feedback line 36. Thereby, the pressure prevailing in the reservoir 30 falls correspondingly until the desired value 41 is reached. The pressure at the anode 4 falls substantially according to course 44 in the reservoir 30 during feedback. According to FIG. 3, the pressure at the anode 4 falls to about 0.2 bar. This pressure corresponds to an adjustable threshold value required for an effective operation of the fuel cell 1. Substantially as soon as the feed-pressure control unit 33 is closed by the control means 38, this threshold value will be set. Here, this threshold value must be set so as to provide for the pressure difference necessary between the anode 4 and the reservoir 30 after the discharge cycle 42. As soon as the desired value 41 and the threshold value are reached, the feedback-pressure control unit 37 will be closed and the feed-pressure control unit 33 be opened so as to allow for the pressure at the anode 4 to again reach the desired value 40 necessary. Thus, the pressure difference necessary between the anode 4 and the reservoir 30 is restored for the so-called normal operation of the fuel cell 1 and for the discharge cycle 42 following.

Such a discharge cycle 42 lasts from about two to ten seconds, depending on the actual hydrogen consumption, and is performed according to the invention depending on the respective state of operation of the fuel cell 1, in particular on the cell voltage.

Thus, the excessive water 10 for humidifying the anode 4 is discharged from the anode 4 via the inventive pressure-control method during the discharge cycles 42, without negatively influencing the degree of efficiency of the fuel-cell system. This is also assisted by the feedback of the gas portion 32 into the feed means of hydrogen 2 via the feedback line 36 since the water 10 at the anode 4 is thereby pushed towards the discharge line 29. Thus, the water 10 can simply be discharged without causing a cell-voltage reduction.

In order to ensure that the anode 4 is sufficiently supplied with hydrogen 2 during the discharge cycles 42, hydrogen 2 may be admixed to the gas portion 32 by an appropriate control of the feed-pressure control unit 33. This control is effected in that, e.g., a sensor measures the portion of hydrogen 2 in the gas portion 32 in the reservoir 30, forwards the same to the control means 38, which appropriately adjusts the feed-pressure control unit 33. Likewise, the control means 38 may, for example, also adjust the feed-pressure control unit 33 periodically by setting time standards based on empirical values. Of course, such a sensor also offers that the gas portion 32 will not be fed back if the portion of hydrogen 2 in the gas portion 32 is too small, but will be released into the ambient air. Here, the supply of the anode 4 with hydrogen 2 will not be interrupted during the discharge cycle 42. It is thereby ensured that the pressure prevailing in the reservoir 30 will be reduced for the discharge cycle 42 following, and that the anode 4 will be supplied with hydrogen 2.

Since the mixture 28 is discharged during the discharge-cycles 42, a corresponding amount of condensate 31 accumulates in the reservoir 30. The condensate is discharged from the reservoir 30 via the condensate-pressure control unit 35. The control means 38 controls the condensate-pressure control unit 35 such that enough room will be provided for the mixture 28 arriving during the next discharge cycle 42, and that the appropriate pressure in the reservoir 30 will prevail. Thus, the pressure difference between the anode 4 and the reservoir 30 allow for the inventive pressure-control method to be carried out. Of course, it is also possible to discharge the reservoir 30 completely, whereby also the portion of inert gases in the gas portion 32 will be advantageously reduced. The condensate 31 discharged via the condensate-pressure control unit 35 may be admixed to the air-supply means of the cathode 5 for humidifying the cathode 5, or directly admixed with a portion of water 10 to the exhaust air of the cathode 5, as is known from the prior art.

That is to say, the inventive pressure-control means is based on activating and/or controlling the corresponding pressure-control units 33, 34, 35, 37 via the control means 38 so as to provide for the pressure difference required between the anode 4 and the reservoir 30. Here, the discharge-pressure control unit 34, the feedback-pressure control unit 37 and the condensate-pressure control unit 35 are preferably formed by one switch valve each and the feed-pressure control unit 33 by a control valve. In the most simple case, the feedback-pressure control unit 37 may also be formed by a non-return valve instead of a switch valve.

Of course, the inventive pressure-control method may also be used for feedback via the discharge line 29. Here, the discharge line 29 additionally acts as a feedback line 36, which is omitted in this case, and the discharge-pressure control unit 34 additionally functions as a feedback-pressure control unit 37. Thus, the gas portion 32 will not be fed back from the reservoir into the feed means of hydrogen 2, but will be fed back to the anode 4 substantially via the discharge line 29. Here, the pressure control according to FIGS. 3 to 6 will be amended only inasmuch as, instead of the feedback-pressure control unit 37, the discharge-pressure control unit 34 will be opened in the direction opposite to that during discharge.

The invention claimed is:

1. A method for controlling the feedback of hydrogen from a reservoir to an anode of a fuel cell, comprising the following steps:

feeding hydrogen to the anode via a feed-pressure control unit;
feeding oxygen or air to a cathode;
periodically discharging a mixture which consists of a gas portion and a condensate, from the anode in a discharge cycle via a discharge line and a discharge-pressure control unit to a reservoir by periodically opening the discharge pressure control unit when the pressure prevailing in the reservoir is lower than the pressure in a feed means of hydrogen, the discharge cycle comprising the following steps:
 (a) increasing the pressure prevailing in the feed means of hydrogen above a desired value,
 (b) opening the discharge-pressure control unit for discharging the mixture to the reservoir when the increased pressure is achieved,
 (c) maintaining the increased pressure prevailing in the feed means of hydrogen during discharging of the mixture to the reservoir so that the pressure in the reservoir is increased,
collecting and separating the mixture in the reservoir into a gas portion and a condensate;
feeding the gas portion back to the anode without the use of a hydrogen pump, the step of feeding the gas portion back comprising the following steps:
 i. closing the discharge-pressure control unit and the feed-pressure control unit when a difference between the pressure in the anode and the pressure in the reservoir reaches a preset minimum level;
 ii. thereafter opening a feedback-pressure control unit connected to a feedback line when the pressure in the anode drops to a pre-set threshold level, whereupon hydrogen in the reservoir is fed back in the feedback line to the anode without the use of a hydrogen pump, due to the pressure difference between the reservoir and the anode; and
 iii. closing the feedback pressure control unit and opening the feed pressure control unit when the pressure in the reservoir drops to a desired value.

2. The method according to claim 1, wherein the discharge cycle is started as a function of the cell voltages of the fuel cell.

3. The method according to claim 1, wherein during step (a) of the discharge cycle, the pressure in the feed means of hydrogen is increased from a preset desired value of about 0.4 bar to about 0.45 bar.

4. The method according to claim 1, wherein the desired value of pressure prevailing in the reservoir is about 0.2 bar.

5. The method according to claim 4, wherein the pressure prevailing in the reservoir is increased from the desired value of about 0.2 bar to about 0.4 bar during step (c) of the discharge cycle.

6. The method according to claim 1, wherein after step (iii) the pressure in the feed means of hydrogen is then increased to a desired value which lies in the range of about 0.4 bar.

7. The method according to claim 1, wherein the discharge cycle is effected within a period of between one second and ten seconds.

8. The method according to claim 6, wherein between the discharge cycles, the pressure in the feed means of hydrogen is kept constant at the desired value thereof and the pressure prevailing in the reservoir is kept constant at the desired value thereof.

9. The method according to claim 1, wherein the functions of the fuel cell are completely maintained, irrespective of the changes in pressure.

10. The method according to claim 1, wherein the gas portion is fed back to the feed means of hydrogen.

11. The method according to claim 1, further comprising the step of periodically discharging the condensate from the reservoir between discharge cycles after the mixture has been discharged approximately ten to twenty times.

12. The method according to claim 1, wherein the condensate in the reservoir is admixed to oxygen-feed or air-feed means of the cathode via a condensate-pressure control unit.

13. The method according to claim 12, wherein pressure in the air-feed means is reduced for a period during which the condensate is admixed.

14. The method according to claim 11, wherein the condensate in the reservoir is admixed to an exhaust air of the cathode of the fuel cell via a condensate-pressure control unit.

15. A method for controlling the feedback of hydrogen from a reservoir to an anode of a fuel cell, comprising the following steps:
 feeding hydrogen to the anode via a feed-pressure control unit;
 feeding oxygen or air to a cathode;
 periodically discharging a mixture which consists of a gas portion and a condensate, from the anode in a discharge cycle via a discharge line and a discharge-pressure control unit to a reservoir by periodically opening the discharge pressure control unit when the pressure prevailing in the reservoir is lower than the pressure in a feed means of hydrogen, the discharge cycle comprising the following steps:
  (d) increasing the pressure prevailing in the feed means of hydrogen above a desired value,
  (e) opening the discharge-pressure control unit for discharging the mixture to the reservoir when the increased pressure is achieved,
  (f) maintaining the increased pressure prevailing in the feed means of hydrogen during discharging of the mixture to the reservoir so that the pressure in the reservoir is increased,
 collecting and separating the mixture in the reservoir into a gas portion and a condensate;
 feeding the gas portion back to the anode without the use of a hydrogen pump, the step of feeding the gas portion back comprising the following steps:
  i. closing the discharge-pressure control unit and the feed-pressure control unit when a difference between the pressure in the anode and the pressure in the reservoir reaches a preset minimum level;
  ii. opening the discharge-pressure control unit when the pressure in the anode drops to a pre-set threshold level, whereupon hydrogen in the reservoir is fed back to the anode without the use of a hydrogen pump, due to the pressure difference between the reservoir and the anode; and
  iii. closing the discharge pressure control unit and opening the feed pressure control unit when the pressure in the reservoir drops to a desired value.

16. A fuel cell comprising:
 at least one cell with one anode and one cathode each,
 a hydrogen-feed means connected with the anode, said hydrogen-feed means comprising a feed-pressure means,
 an oxygen-feed or air-feed means connected to the cathode;
 a discharge line connected to the anode, said discharge line comprising a discharge-pressure control unit, for discharging a mixture consisting of a gas portion and a condensate,
 a reservoir connected with the discharge line and with the anode via a feedback line for feeding back hydrogen separated from the reservoir;
 a feedback-pressure control unit arranged in the feedback line; and
 a control means connected to the feedback-pressure control unit, the feed-pressure control unit and the discharge-pressure control unit, so that the control means opens the discharge-pressure control unit for periodically discharging the mixture, and the mixture is conveyed into the reservoir via the discharge line when the pressure prevailing in the reservoir is lower than that in the feed means of hydrogen,
 wherein the control means is configured to control the pressure prevailing in the reservoir based on the pressure in the feed means of hydrogen,
 wherein during discharge, the control means is configured to increase the pressure in the feed means and maintain the increased pressure until the pressure difference between the feed means of hydrogen and the reservoir reaches a preset minimum level,
 wherein during feedback, the control means is configured to close the feed-pressure control unit and discharge-pressure control unit when the pressure difference reaches the preset minimum level, which then reduces the pressure in the anode to a threshold value that substantially corresponds to the desired value of the pressure prevailing in the reservoir, and opens the feedback pressure control unit after the threshold value in the anode is reached to supply the anode with hydrogen from the gas portion in the reservoir via the feedback line without the use of a hydrogen pump,
 wherein when the pressure in the reservoir reaches the desired level, the control means is configured to close feedback-pressure control unit and opens the feed-pressure control unit to finish the discharge cycle.

17. The fuel cell according to claim 16, wherein the reservoir is connected with a discharge line, which includes a condensate-pressure control unit, for discharging the condensate from the reservoir.

18. The fuel cell according to claim 17, wherein the discharge line provided for the condensate is connected with the oxygen-feed or air-feed means of the cathode.

19. The fuel cell according to claim 16, wherein the discharge line for the condensate is connected with a discharge line of the cathode provided for exhaust air.

20. The fuel cell according to claim 17, wherein at least one of the discharge-pressure control unit, the feedback-pressure control unit and the condensate-pressure control unit is formed by switch valves.

21. The fuel cell according to claim 16, wherein the feed-pressure control unit is formed by a control valve.

22. The fuel cell according to claim 16, wherein the feedback-pressure control unit is formed by a non-return valve.

23. The fuel cell according to claim 16, wherein the control means is connected with a unit for detecting cell voltage.

* * * * *